United States Patent [19]

Parkyn, Sr.

[11] Patent Number: 4,602,659
[45] Date of Patent: Jul. 29, 1986

[54] REPAIR IN HOLES AND CRACKS IN CLAY SEWER PIPE

[75] Inventor: William A. Parkyn, Sr., 1810 Diana Ave., Anaheim, Calif. 92805

[73] Assignees: William A. Parkyn, Sr.; Kathleen C. Parkyn, both of Anaheim, Calif.

[21] Appl. No.: 600,893

[22] Filed: Apr. 16, 1984

[51] Int. Cl.⁴ ............................................. F16L 55/18
[52] U.S. Cl. ........................................ 138/98; 138/97; 138/93; 264/36; 264/269
[58] Field of Search ................. 138/89, 90, 93, 97, 138/98; 156/287; 264/36, 267, 269

[56] References Cited

U.S. PATENT DOCUMENTS

| | | | |
|---|---|---|---|
| 3,103,235 | 9/1963 | Stringham | 138/93 X |
| 3,726,319 | 4/1973 | Patterson | 138/93 X |
| 3,834,422 | 9/1974 | Larson | 138/93 X |
| 4,245,970 | 1/1981 | St. Onge | 138/93 X |
| 4,429,720 | 2/1984 | Beck et al. | 138/97 |
| 4,436,120 | 3/1984 | Josren et al. | 138/93 |

Primary Examiner—James E. Bryant, III
Attorney, Agent, or Firm—William W. Haefliger

[57] ABSTRACT

The repair of a sewer line having a fracture, and employing a liner sleeve and an elastomer sleeve extending about the line sleeve, and a filler slurry, includes:
(a) installing the liner sleeve and the elastomer sleeve endwise in the sewer line to locate the two sleeves in bridging relation with the fracture, and
(b) displacing slurry into a space formed between the two sleeves to cause the elastomeric sleeve to expand and seal against the sewer line in bridging relation with the fracture.

8 Claims, 9 Drawing Figures

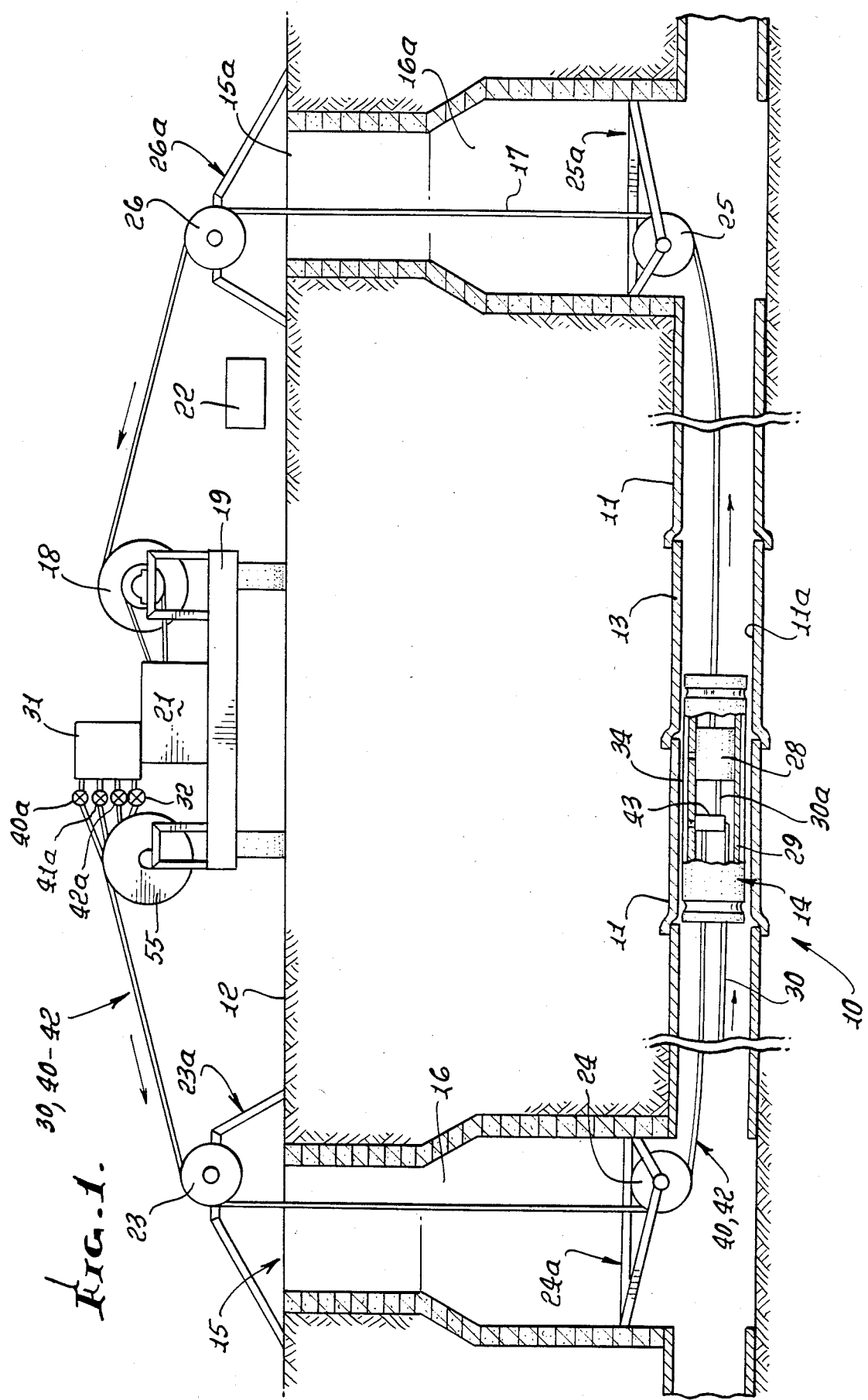

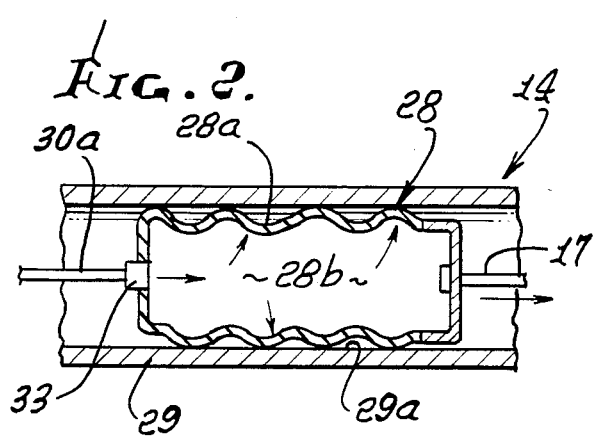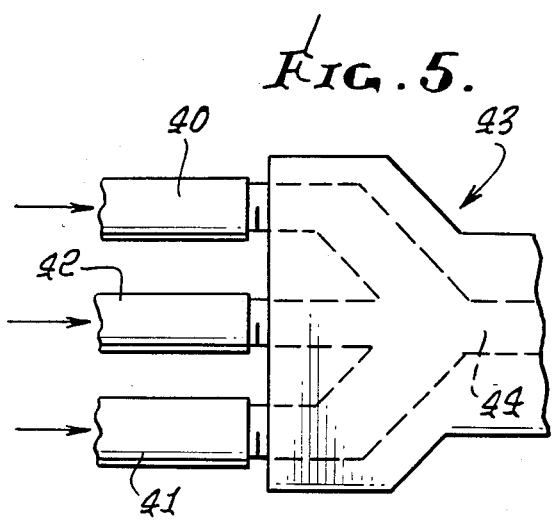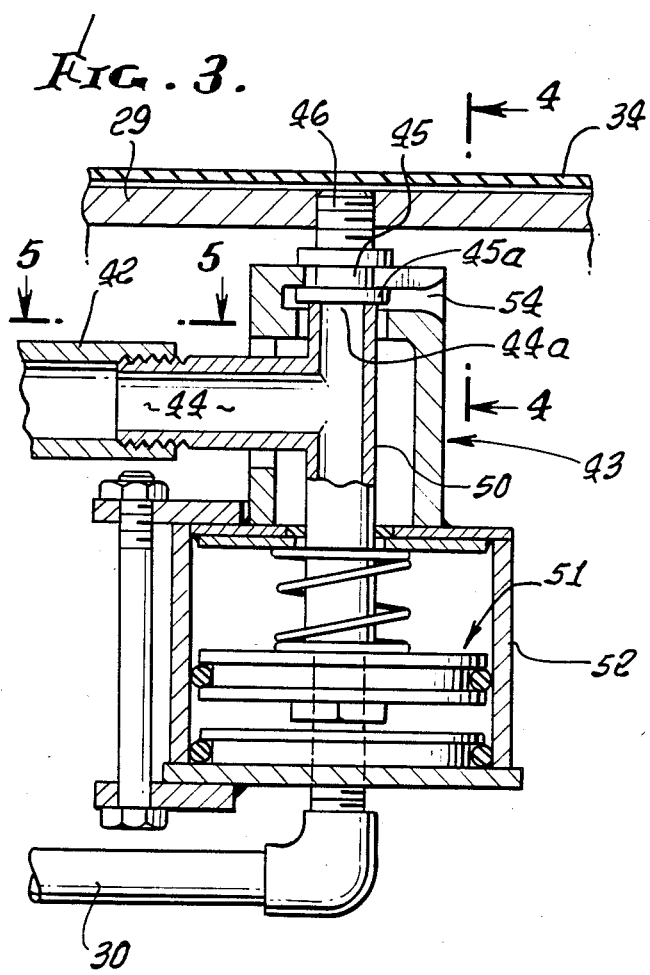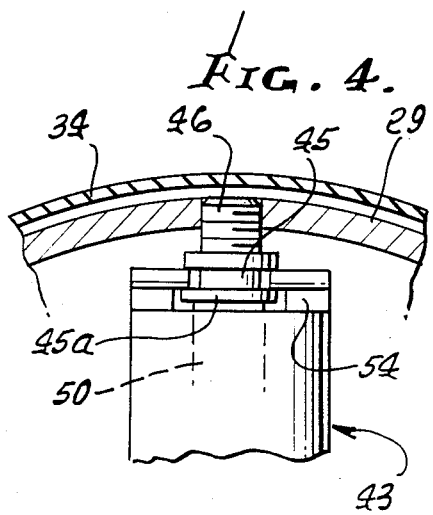

REPAIR IN HOLES AND CRACKS IN CLAY SEWER PIPE

BACKGROUND OF THE INVENTION

This invention relates generally to repair of sewer lines, and more particularly to simple and effective apparatus and method to inexpensively repair such lines.

In the past, fracturing of clay pipe lines necessitated digging up the line along its length, removing the old pipe, installing new pipe, and filling in the dirt and repairing the overlying road surface. This was a very expensive operation, and one that hardly warranted such expense and effort where the clay pipe line was fractured in only a few places.

SUMMARY OF THE INVENTION

It is a major object of the invention to provide method and apparatus to repair such lines without digging up the line, thus saving great expense and effort.

Basically, the method employs a liner sleeve and elastomer sleeve extending about the liner sleeve, and a filler slurry, and includes the steps:

(a) installing the liner sleeve and said elastomer sleeve end wise in the sewer line to locate the two sleeves in bridging relation with the fracture, and (b) displacing slurry into a space formed between the two sleeves to cause the elastomeric sleeve to expand and seal against the sewer line in bridging relation with the fracture.

The slurry is typically displaced radially through the liner sleeve into the space between the sleeves and via a fixture which is releasably attached to the liner sleeve to travel therewith in the sewer line, the fixture being detachable from the liner sleeve and recoverable after slurry displacement is accomplished.

Further, a drag system may be employed to drag the two sleeves endwise in the sewer line to the fracture location, and the drag system may then be released for recovery thereof. The positioning of the drag cable may be correlated to the position of a scanning camera used to preliminarily locate the fracture, whereby the position of the fracture may be accurately determined so that the elastomer sleeve may accurately bridge the fracture.

These and other objects and advantages of the invention, as well as the details of an illustrative embodiment, will be more fully understood from the following description and drawings, in which:

DRAWING DESCRIPTION

FIG. 1 is a vertical elevation, in section, showing details of installation of a liner and elastomer sleeve unit;

FIG. 2 is an enlarged elevation, in section, showing details of a puller unit;

FIG. 3 is an enlarged vertical elevation showing details of a fluid connector releasably attached to a liner and sleeve unit;

FIG. 4 is a section, in elevation, on lines 4—4 of FIG. 3;

FIG. 5 is a fragmentary plan view on lines 5—5 of FIG. 3;

DETAILED DESCRIPTION

Figure 6:
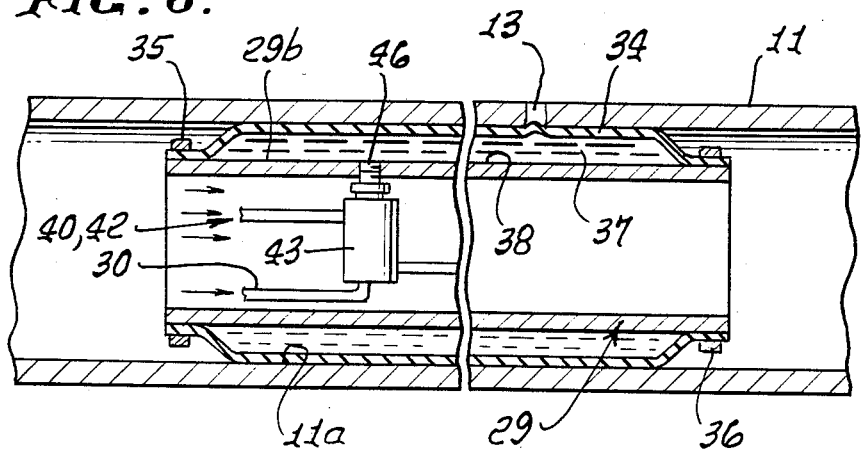
FIG. 6 is an enlarged vertical elevation showing sealing off of a fracture in a clay pipe line, employing the liner and sleeve unit.

Referring first to FIG. 1, sewer line 10 has clay pipes 11 laid end-to-end, under the ground surface 12. When one or more of the pipes developes a fracture, as at 13, the problem of how to economically repair the line is presented.

In accordance with the invention, a liner and elastomer sleeve "pig" unit 14 is employed, and is introduced underground, or via first manhole 15, and the clay pipe line, to be traveled endwise therein to the location of the fracture. See FIG. 1, showing a puller cable 17. The latter is first introduced downwardly in well 16, through the pipe line 10, and run up second well 16a through manhole 15a to winch 18 on a vehicle or truck 19. As winch 18 is rotated by motor and drive 21, the cable 17 is pulled endwise, to pull unit 14 underground and along the pipe line to the location of the fracture. That location may first be determined as by a television camera 22 advanced endwise by the cable in line 10. Idler drums 23–26 and associated frames 23a–26a may first be installed in and above the wells 16 and 16a, as shown, so that the unit 14 may be pulled endwise down well 16, around drum 24, and endwise in the pipe line 10, and so that the cable will travel in the same manner, as well as up well 16a, around drum 26, and onto the winch 18. The length of the cable 17 extended when camera 22 locates the fracture may be noted and used to subsequently register the unit 14 across the fracture.

The unit 14 may be attached to the cable as by a tubular container shell 28 closely fitting endwise within the bore 29a of a liner sleeve 29 of unit 14 (see FIG. 2). The wall 28a of shell 28 is shown as of bellows shape, to expand and grip bore 29a in response to air pressurization of the shell interior 28b, air supplied via hoses 30 and 30a extending from a surface pressure source 31, and controlled by valve 32. When the valve 32 is closed, pressurization of bellows wall 28a ceases, and cable 17 and container 28 may be pulled free of the installed unit 14, as by operation of winch 18. A snap release connection of the air hose 30a to container wall 28a is shown at 33.

The unit 14 also includes an elastomer sleeve 34 attached to and extending about the liner sleeve 29, as for example as shown in FIGS. 1 and 6. Metallic bands 35 and 36 at opposite ends of the unit 14 annularly hold the ends of the elastomer sleeve tightly and sealingly against the circular surface of the lower sleeve, and in travel mode, the elastomer sleeve 34 fits closely about a cylindrical surface 29b of sleeve 29, between the bands.

FIG. 6 shows the unit having arrived at the fracture in the clay pipe sewer line. It is brought into bridging relation with the fracture, as shown. At that point, slurry 37 is displaced into a space between the sleeves and under pressure, to cause the sleeve 34 to expand outwardly and seal against the bore 11a of the sewer line pipe that is fractured, to establish an annular seal against the bore and bridging the fracture. Thereafter, the liquid contents of the line flow through the liner pipe 29, which becomes anchored to the sewer line due to the liner 34 expanding into the fraction and held there by hardening of the slurry 37 in the space 38. Typical slurries include resin which polymerizes in situ in space 38, as for example epoxy resins, and grout, and a catalyst if required.

FIGS. 3–6 show means for feeding slurry and grout components in two lines or hoses 40 and 41, and a catalyst in hose 42, extending from the surface to the unit 14. These components are fed together or blended in a mixer fitting 43 (see FIG. 5), and then fed in a bore 44 upwardly at 44a and through an attachment fitting 45 into space 38. Fitting 45 may be a grease type fitting thread connected to the wall of liner 29, as at 46. See also surface control valves 40a 41a and 42a.

Mixture fitting 43 is releasably connected to wall fitting 45, so that fitting 43 can be removed, i.e. pulled free of the unit 14, after slurry delivery to space 38. As shown, the duct 44a is within a short stroke plunger 50 urged upwardly by air pressure to grip the lower end 45a of the fitting 45, as during travel of unit 14 into FIG. 6 position, and during delivery of slurry components into space 38. Such air pressure, delivered by hose 30, is exerted upwardly against a piston 51 slidable in cylinder 52, and connected to plunger 50. At such times as disconnection and retrieval of the fitting 43 and associated apparatus is desired, the air pressure is shut off, as by closure of the valve 32, which causes the plunger 50 to release from the fitting 45. The fitting 43 may then be pulled leftwardly in FIG. 3, so that the fixture 45 lower end flange 45b slides out of a slot 54 in fixture 43, the latter then being pulled out of the sewer by operation of winch 55 reeling the hoses 30, and 40–42.

Figure 7:
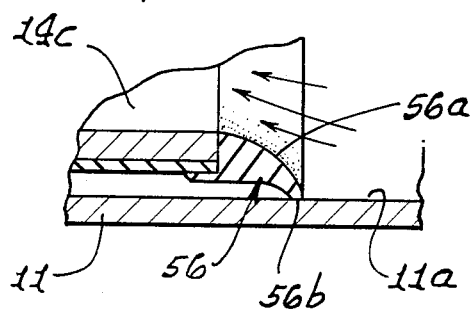
FIG. 7 is an enlarged fragmentary section showing a flow smoothing ring on the liner and sleeve unit.

FIG. 7 shows an elastomer or rubber ring 56 attached to the forward traveling end of the unit 14, and having a flaring bore 56a, to cause sewer liquids to flow into the interior 14c of unit 14, as unit 14 travels rightwardly in FIG. 7. Note that the annular outer edge 56b of ring 56 travels closely adjacent the bore 11a of the sewer line clay pipe 11.

Figure 8:
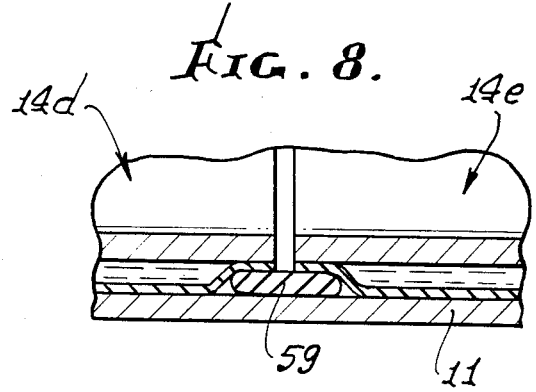
FIG. 8 is an enlarged fragmentary section showing end-to-end interconnection of two liner and sleeve units.

FIG. 8 shows the use of an elastomer annulus 59 fitting over the end of one unit 14d and over the end of a previously installed unit 14e to establish a seal therebetween. When unit 14d is pulled toward and endwise against unit 14e, the annulus 59, installed on either unit, fits over the other unit.

Figure 9:
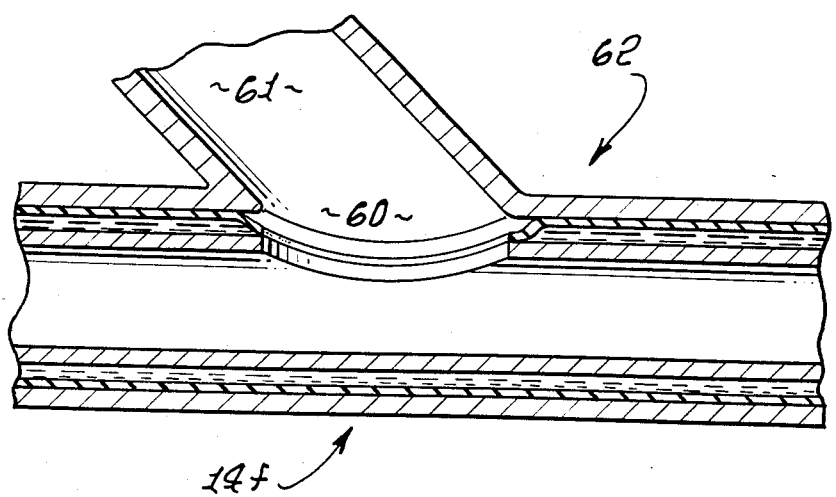
FIG. 9 is a view like FIG. 6, showing application to a branching clay pipe line.

FIG. 9 shows a modified unit 14f, like unit 14, but having a side opening 60 to register with a branch passage 61 in a clay pipe 62.

I claim:

1. In aoparatus for repairing a sewer line having a fracture,
   (a) a liner sleeve, and an elastomer sleeve extending about the liner sleeve,
   (b) means for installing the liner sleeve and said elastomer sleeve endwise in the sewer line to locate the two sleeves in bridging relation with the fracture,
   (c) means for displacing filler between the two sleeves to cause the elastomeric sleeve to expand and seal along its length against the sewer line in adjacent bridging relation with the fracture,
   (d) said means for displacing filler comprising a delivery system including elongated hose means extensible underground, and means to releasably attach said system to said liner sleeve, for travel in the sewer line, and for release from the liner sleeve after said filler displacement,
   (e) there being a fitting in said sleeve and a fixture to pass filler through said fitting to which said fixture is releasably and controllably clamped, and ducting in said fixture to mix said filler, and including a fluid pressure responsive actuator to maintain the fixture releasably clamped to said fitting, and a fluid pressure line extensible in the sewer to said actuator.

2. The aoparauts of claim 1 wherein said elastomeric sleeve is attached near its opposite ends to the liner sleeve, to provide space therebetween when the filler expands the elastomeric sleeve.

3. Apparatus of claim 1 wherein said (b) means includes structure for dragging said liner sleeve with said elastomeric sleeve attached thereto endwise in said sewer line by manipulation of a drag line releasably attached to said liner sleeve.

4. The apparatus of claim 1 wherein the filler includes two components which when mixed cause hardening of the filler, and including means for mixing said components within the sewer line.

5. Apparatus as defined in claim 4 wherein said components include polymerized resin and grout.

6. The apparatus of claim 1 including a fluid pressure responsive pull system releasably connected to said liner sleeve, for pulling that sleeve endwise in the sewer.

7. Apparatus as defined in claim 1 including a tapered annulus on the end of said liner sleeve to guide sewer liquid into said sleeve.

8. Apparatus as defined in claim 1 including an elastomer ring on the end of said liner sleeve to fit about the end of a next adjacent liner sleeve in the sewer.

* * * * *